United States Patent
Hotaka et al.

(10) Patent No.: US 7,714,977 B2
(45) Date of Patent: May 11, 2010

(54) LIQUID CRYSTAL OPTICAL MODULATION ELEMENT AND OPTICAL HEAD DEVICE

(75) Inventors: Hiroki Hotaka, Koriyama (JP); Hiroshi Kumai, Koriyama (JP); Makoto Hasegawa, Koriyama (JP); Yayoi Yamamori, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 264 days.

(21) Appl. No.: 11/618,177

(22) Filed: Dec. 29, 2006

(65) Prior Publication Data

US 2007/0104895 A1 May 10, 2007

Related U.S. Application Data

(63) Continuation of application No. PCT/JP2005/011813, filed on Jun. 28, 2005.

(30) Foreign Application Priority Data

Jun. 29, 2004 (JP) .............................. 2004-191257

(51) Int. Cl.
*G02F 1/13* (2006.01)
*C09K 19/00* (2006.01)

(52) U.S. Cl. .................... 349/182; 349/186; 252/299.01

(58) Field of Classification Search ...... 349/2, 349/57, 61, 123, 182, 186, 198, 193; 252/299.01; 428/1.1
See application file for complete search history.

(56) References Cited

U.S. PATENT DOCUMENTS

| 5,891,357 | A | * | 4/1999 | Akashi et al. | ........... 252/299.01 |
| 6,153,722 | A | | 11/2000 | Schoenfeld et al. | |
| 6,767,937 | B2 | * | 7/2004 | Schunk et al. | ............... 523/448 |
| 7,081,281 | B2 | * | 7/2006 | Kumai et al. | .................. 428/1.1 |
| 7,371,438 | B2 | * | 5/2008 | Kaida et al. | .................... 428/1.1 |

FOREIGN PATENT DOCUMENTS

| CN | 1408749 A | 4/2003 |
| DE | 195 39 141 | 4/1997 |
| JP | 6-095083 A | 4/1994 |
| JP | 7-036008 A | 2/1995 |
| JP | 9-230300 A | 9/1997 |
| JP | 9-291282 | 11/1997 |
| JP | 2002-237077 | 8/2002 |
| JP | 2002-260269 | 9/2002 |
| JP | 2003-90990 | 3/2003 |

\* cited by examiner

*Primary Examiner*—David Nelms
*Assistant Examiner*—Tai Duong
(74) *Attorney, Agent, or Firm*—Oblon, Spivak, McClelland, Maier & Neustadt, L.L.P.

(57) ABSTRACT

A liquid crystal optical modulation element to modulate a laser beam having a wavelength of at most 500 nm, which contains a layer of a liquid crystal composition sandwiched between a pair of transparent substrates facing each other, wherein each transparent substrate has an electrode and an alignment film having a polyimide on the surface which faces the other transparent substrate, the alignment film and the liquid crystal composition are in contact with each other, and the liquid crystal composition contains at least one antioxidant.

9 Claims, 2 Drawing Sheets

FIG. 1

LIQUID CRYSTAL OPTICAL MODULATION ELEMENT AND OPTICAL HEAD DEVICE

TECHNICAL FIELD

The present invention relates to a liquid crystal optical modulation element to be used to modulate a laser beam having a wavelength of at most 500 nm.

BACKGROUND ART

A liquid crystal element is small in size and has high durability since it has no moving element, and has been thereby attracted attention for an optical modulation element. For example, its use as a laser beam modulation element as mounted on an optical head device has been proposed (for example, Patent Documents 1 and 2). In recent years, for the purpose of improving the recording density, blue shift of the laser beam to be used for reading and writing on an optical disk is in progress, and development of a high density optical disk which employs a laser beam having a wavelength of at most 500 nm (a wavelength in the vicinity of 405 nm for example) for reading and writing is in progress. Accordingly, a liquid crystal element to modulate a laser beam in this wavelength region is required (for example, Non Patent Document 1).

A liquid crystal element used for such an application is usually one having a layer of a liquid crystal composition sandwiched between a pair of transparent substrates facing each other, and each of the pair of transparent substrates has an electrode and an alignment film comprising a polyimide laminated in this order on the surface which faces the other transparent substrate, and the alignment film and the liquid crystal composition are in contact with each other. This alignment film is usually subjected to rubbing treatment, and liquid crystals in contact with one another in the liquid crystal composition are aligned in the rubbing direction with an angle of from several degrees to about ten degrees with the surface to which the alignment film is applied (hereinafter this angle will be referred to as the "pretilt angle"). As a material of the alignment film, a polyimide, which has high heat resistance and insulating properties, has been widely used.

Patent Document 1: JP-A-2002-260269
Patent Document 2: JP-A-2002-237077
Non Patent Document 1: "2002 International Symposium on Optical Memory and Optical Data Storage Topical Meeting Technical Digest" p. 57

DISCLOSURE OF THE INVENTION

Problems that the Invention is to Solve

However, the present inventors have found that when a liquid crystal element having a polyimide alignment film is used as a modulation element for a laser beam having a wavelength of from 350 to 500 nm (hereinafter sometimes referred to as a blue laser beam), the alignment state of liquid crystal changes from the initial state.

For example, when application of a blue laser beam was continued on a liquid crystal element such that the initial alignment of the liquid crystal is an untwisted alignment (e.g. parallel alignment, anti-parallel alignment, bend alignment) without a twist around the optical axis direction of the liquid crystal element so that the polarization direction of the entering blue laser beam is substantially in parallel with the liquid crystal alignment direction, a twist of the alignment of the liquid crystal around the optical axis of the element was observed.

Further, also when application of a blue laser beam was continued on a liquid crystal element such that the initial alignment of the liquid crystal is a twisted alignment with a twist around the optical axis direction of the element so that the polarization direction of the entering blue laser beam is in parallel with the alignment direction of at least part of the liquid crystal in the element (that is, the polarization direction of the blue laser beam is within the twist angle), an increase of the twist angle as compared with the initial state was observed.

Further, when application of a blue laser beam is continued, an increase of the pretilt angle as compared with the initial state was also observed.

As mentioned above, when application of a blue laser beam is continued on the liquid crystal element having a polyimide alignment film on a surface in contact with the liquid crystal composition, a change in the liquid crystal alignment state (i.e. generation and an increase of the twist angle, an increase of the pretilt angle) occurs, whereby the optical modulation properties of the liquid crystal element will be deteriorated, and the liquid crystal element will no longer be used practically.

Means of Solving the Problems

The present invention is made to solve the above problems, and provides a liquid crystal optical modulation element capable of stably modulating a blue laser beam for a long period of time. Namely, the present invention provides the following.

(1) A liquid crystal optical modulation element to modulate a laser beam having a wavelength of at most 500 nm, which comprises a layer of a liquid crystal composition sandwiched between a pair of transparent substrates facing each other, characterized in that each of the pair of transparent substrates has an electrode and an alignment film comprising a polyimide on the surface which faces the other transparent substrate, the alignment film and the liquid crystal composition are in contact with each other, and the liquid crystal composition contains an antioxidant.

(2) A liquid crystal optical modulation element to modulate a laser beam having a wavelength of at most 500 nm, which comprises a layer of a liquid crystal composition sandwiched between a pair of transparent substrates facing each other, characterized in that each of the pair of transparent substrates has an electrode and an alignment film comprising a polyimide on the surface which faces the other transparent substrate, the alignment film and the liquid crystal composition are in contact with each other, and the liquid crystal composition contains a hindered amine compound.

(3) A liquid crystal optical modulation element to modulate a laser beam having a wavelength of at most 500 nm, which comprises a layer of a liquid crystal composition sandwiched between a pair of transparent substrates facing each other, characterized in that each of the pair of transparent substrates has an electrode and an alignment film comprising a polyimide laminated in this order on the surface which faces the other transparent substrate, the alignment film and the liquid crystal composition are in contact with each other, and the liquid crystal composition contains a hindered amine compound.

(4) A liquid crystal optical modulation element to modulate a laser beam having a wavelength of at most 500 nm, which comprises a layer of a liquid crystal composition sandwiched between a pair of transparent substrates facing each other, characterized in that each of the pair of transparent substrates has an electrode and an alignment film comprising a polyimide on the surface which faces the other transparent substrate, the alignment film and the liquid crystal composition are in contact with each other, and the liquid crystal composition contains a hindered phenol compound.

(5) A liquid crystal optical modulation element to modulate a laser beam having a wavelength of at most 500 nm, which comprises a layer of a liquid crystal composition sandwiched between a pair of transparent substrates facing each other, characterized in that each of the pair of transparent substrates has an electrode and an alignment film comprising a polyimide on the surface which faces the other transparent substrate, the alignment film and the liquid crystal composition are in contact with each other, and the liquid crystal composition contains a hindered amine compound and a hindered phenol compound.

(6) The liquid crystal optical modulation element according to any one of (1) to (5), which modulates a laser beam having a wavelength of from 380 to 450 nm.

(7) The liquid crystal optical modulation element according to any one of (2), (3), (5) and (6), wherein the amount of the hindered amine compound is from 0.01 to 5 mass % of the entire amount of the liquid crystal composition.

(8) The liquid crystal optical modulation element according to any one of (2), (3), (5), (6) and (7), wherein the hindered amine compound is a 2,2,6,6-tetraalkylpiperidine derivative.

(9) The liquid crystal optical modulation element according to any one of (4), (5) and (6), wherein the amount of the hindered phenol compound is from 0.01 to 5 mass % of the entire amount of the liquid crystal composition.

(10) An optical head device comprising a light source for emitting a laser beam having a wavelength of at most 500 nm, an objective lens for converging the laser beam emitted from the light source on an optical recording medium, a photodetector for receiving the light converged and reflected on the optical recording medium, and the liquid crystal optical modulation element as defined in any one of (1) to (9), disposed in an optical path between the light source and the optical recording medium or in an optical path between the optical recording medium and the photodetector.

EFFECTS OF THE INVENTION

According to the liquid crystal optical modulation element modulating a blue laser beam of the present invention, a change of the liquid crystal alignment state can be suppressed and favorable optical modulation properties can be maintained.

BEST MODE FOR CARRYING OUT THE INVENTION

Figure 1:
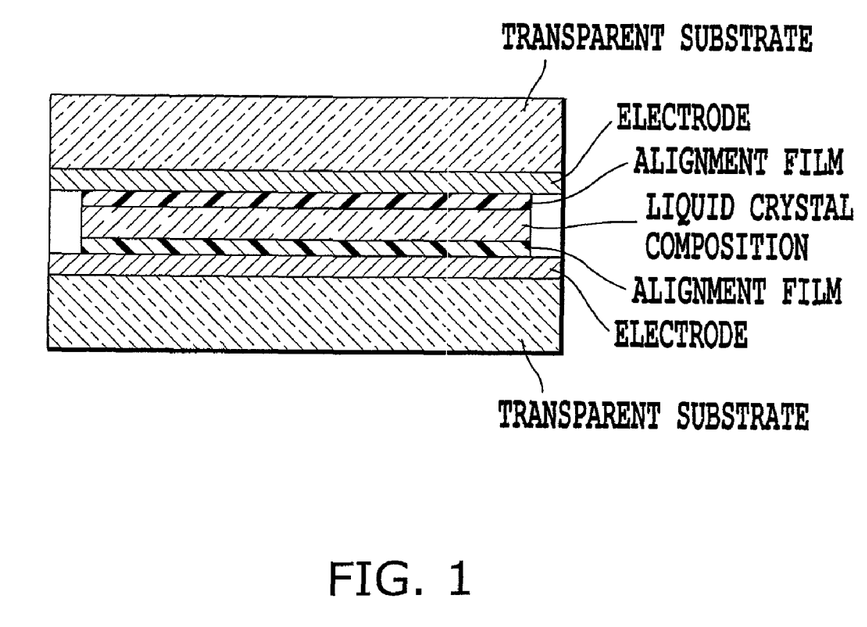
FIG. 1 is a cross-sectional view of a liquid crystal optical modulation element.
Figure 2A:
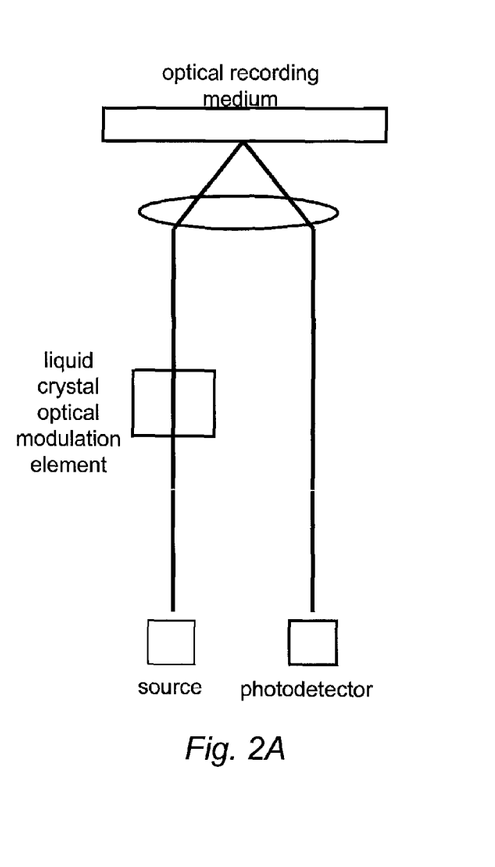
FIGS. 2A, 2B, and 2C are cross-sectional views of an optical head device.
Figure 2B:
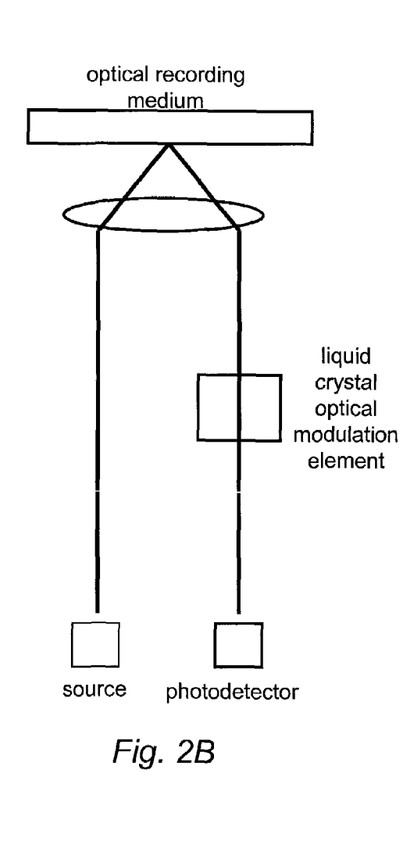
Figure 2C:
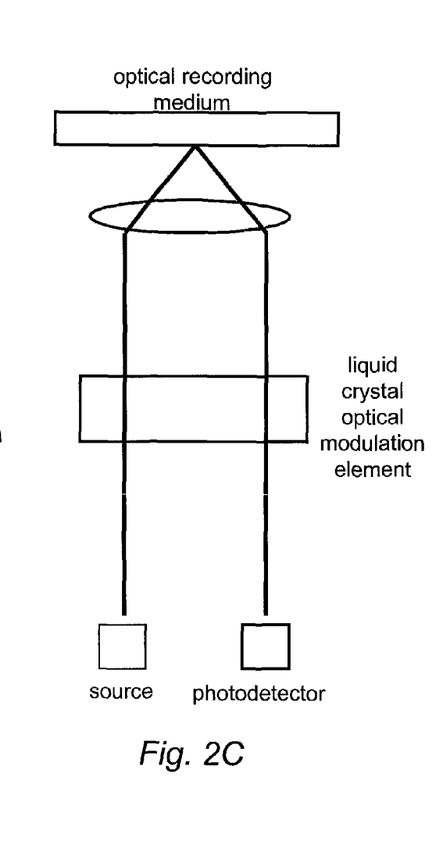

In this specification, a compound represented by the formula (1) will sometimes be referred to as a compound (1). A group represented by the formula (A) will sometimes be referred to as a group (A). The same applies to other compounds and groups. The "bonding angle" means an angle formed by the rubbing directions of the respective alignment films on a pair of substrates facing each other. Further, the wavelength includes a range of the described value ±15 nm even when described as one value.

A liquid crystal cell in the present invention is prepared in such a manner that a pair of laminates each containing a transparent substrate, and electrode and a polyimide alignment film are disposed so that the polyimide alignment film surfaces face each other, and the peripheral portions of the laminates are sealed with a sealing agent. The laminate is preferably a laminate having the electrode and the polyimide alignment film laminated in this order on the transparent substrate, but is not limited thereto. Namely, it may have another layer so long as the polyimide alignment film is formed as a layer most distant from the substrate and the polyimide alignment film surfaces are in contact with the liquid crystal composition. The another layer may, for example, be an interlayer insulating film layer described hereinafter. The another layer may be formed between the substrate and the electrode, or may be formed between the electrode and the polyimide alignment film. Hereinafter, not only a laminate having an electrode and a polyimide alignment film laminated in this order on a transparent substrate but also one having another layer will be referred to as a "laminate".

The transparent substrate is preferably a transparent glass substrate or a transparent resin substrate, particularly preferably a transparent glass substrate in view of high rigidity. The thickness of the transparent substrate is preferably from 0.2 to 1.5 mm, particularly preferably from 0.3 to 1.1 mm. The electrode is preferably a membrane-like transparent electrode prepared by laminating a transparent electrically conductive film such as an ITO film or a $SnO_2$ film e.g. by vapor deposition or sputtering. The membrane-like transparent electrode is preferably patterned e.g. by photolithography or wet etching depending upon the purpose of use.

The polyimide alignment film can be formed by a known method, such as a method of applying a polyamic acid solution, followed by baking, or a method of applying a soluble polyimide solution and volatilizing the solvent. The polyimide is preferably an alicyclic polyimide. In a case where an aromatic polyimide is used, the aromatic ring in the polyimide is preferably substituted by a fluorine atom or a trifluoromethyl group. Further, it is preferred to subject the surface of the alignment film to rubbing treatment.

In a case where the laminate has another layer, it preferably has a layer of an interlayer insulating film comprising an inorganic material for the purpose of preventing short circuiting. Specifically, an interlayer insulating film can be formed by applying a sol of a metal oxide such as $TiO_2$, $SiO_2$, $ZrO_2$ or $Al_2O_3$ to the surface of the transparent electrode film e.g. by spin coating, followed by baking. Otherwise, a membrane of the above metal oxide may be formed by vapor deposition or sputtering. The thickness of such an interlayer insulating film is preferably from 10 to 100 nm. If the thickness of the insulating film layer is less than 10 nm, the function of the insulating film tends to be insufficient, and if it exceeds 100 nm, application of an effective voltage to the liquid crystal composition tends to be difficult.

The liquid crystal cell can be prepared in accordance with a known method, and it can be prepared by the following process, for example. First, a pair of the above laminates is prepared, and a sealing agent such as an epoxy resin is applied circularly to the peripheral portion of the surface on which the polyimide alignment film is formed of at least one of the laminates. With the sealing agent, spacers to obtain a desired cell gap, fine electrically conductive particles to be electrically conductive paths for application of a voltage, etc. may be preliminarily mixed. Then, the pair of laminates were disposed with a desired distance (cell gap) with a desired bonding angle so that the polyimide alignment film surfaces face each other, and the sealing agent is cured to form a void cell. The cell gap is preferably from 1 to 20 μm, particularly preferably from 2 to 10 μm. At least at a part of the circular portion coated with the sealing agent, a discontinuous portion to be an inlet to inject a liquid crystal composition is provided, and a liquid crystal composition is injected from the inlet to prepare a liquid crystal optical modulation element. The liquid crystal composition is injected in a state where it is in contact with the polyimide alignment film.

The structure of the liquid crystal optical modulation element is not limited to the above structure, and for example, an anti-reflection film may be laminated on the opposite side of the transparent substrate from the surface on which the electrode is laminated, or a wave plate or the like may be laminated.

The liquid crystal composition to be used for the liquid crystal optical modulation element of the present invention is a liquid crystal composition containing at least one compound selected from the following compounds (1), (2) and (3), and the total amount of the compounds (1) to (3) is preferably at least 95 mass % based on the liquid crystal composition. The compounds (1) to (3) do not necessarily show liquid crystallinity by themselves, and only a composition containing at least one of them should show nematic liquid crystallinity.

(1)

(2)

(3)

Symbols in the formulae have the following meaning.

j, k, p, q: each independently 0 or 1;

$R^{11}$, $R^{21}$, $R^{22}$, $R^{31}$: each independently a $C_{2-7}$ linear alkyl group, a $C_{2-7}$ linear alkoxy group, a $C_{2-7}$ linear alkenyl group or a $C_{2-7}$ linear alkenyloxy group;

$R^{12}$: a fluorine atom, a trifluoromethyl group, a trifluoromethoxy group or a difluoromethoxy group;

$R^{32}$: a $C_{2-7}$ linear alkyl group or a $C_{2-7}$ linear alkoxy group;

$X^{11}$, $X^{21}$, $X^{13}$, $X^{21}$, $X^{22}$, $X^{23}$ and $X^{31}$: each independently a single bond, $-(CH_2)_2-$, $-(CH_2)_4-$, $-CH_2O-$, $-OCH_2-$, $-(CF_2)_2-$, $-CF_2O-$ or $-OCF_2-$;

$A^{11}$, $A^{21}$, $A^{22}$, $A^{31}$: each independently a trans-1,4-cyclohexylene group or a decahydronaphthalene-2,6-diyl group;

$B^{11}$, $B^{12}$, $B^{21}$, $B^{22}$: each independently a trans-1,4-cyclohexylene group, a decahydronaphthalene-2,6-diyl group, a 1,4-phenylene group or a 1,2,3,4-tetrahydronaphthalene-2,6-diyl group; and $C^{11}$, $C^{31}$: a 1,4-phenylene group or a 1,2,3,4-tetrahydronaphthalene-2,6-diyl group.

Among the above cyclic groups, each of the 1,4-phenylene group and the 1,2,3,4-tetrahydronaphthalene-2,6-diyl group may have at least one hydrogen atom bonded to a carbon atom to each group substituted by a fluorine atom.

The $C_{2-7}$ linear alkyl group is preferably a $C_{2-5}$ linear alkyl group, particularly preferably an ethyl group, a n-propyl group or a n-pentyl group. The $C_{2-7}$ linear alkoxy group is preferably a $C_{2-5}$ linear alkoxy group, particularly preferably an ethoxy group, a n-propyloxy group or a n-butyloxy group.

The $C_{2-7}$ linear alkenyl group is preferably a $C_{2-5}$ linear alkenyl group. Among such alkenyl groups, preferred is a 1-alkenyl group or a 3-alkenyl group (provided that a n-alkenyl group is an alkenyl group having a double bond at the n-st carbon atom from the carbon atom bonded to the cyclic group toward the alkenyl chain terminal) in view of a high elastic constant ratio ($K_{33}/K_{11}$). The $C_{2-7}$ linear alkenyloxy group is preferably a $C_{2-5}$ linear alkenyloxy group.

Each of $R^{11}$, $R^{21}$, $R^{22}$ and $R^{31}$ is preferably a $C_{2-7}$ linear alkyl group. $R^{12}$ is preferably a fluorine atom. $R^{32}$ is preferably a $C_{2-7}$ linear alkoxy group.

Each of $A^{11}$, $A^{21}$, $A^{22}$ and $A^{31}$ is preferably a trans-1,4-cyclohexylene group. Each of $B^{11}$, $B^{12}$, $B^{21}$ and $B^{22}$ is preferably a trans-1,4-cyclohexylene group, a 1,4-phenylene group, the following group ($Ph^F$) or the following group ($Ph^{FF}$). Each of $C^{11}$ and $C^{31}$ is preferably a 1,4-phenylene group, the following group ($Ph^F$) or the following group ($Ph^{FF}$).

(Ph$^F$)   (Ph$^{FF}$)

Each of $X^{11}$, $X^{12}$, $X^{13}$, $X^{21}$, $X^{22}$, $X^{23}$ and $X^{31}$ is preferably a single bond or a $-(CH_2)_2-$.

In the compounds (1) to (3), the number of 1,4-phenylene groups (including a group having at least one hydrogen atom bonded to a carbon atom in such a group substituted by a fluorine atom) directly bonded is preferably at most 2, whereby the stability against the blue laser beam will be higher.

Specific examples of the compounds (1) to (3) are shown below (in the following specific examples, $R^A$ and $R^B$ are each independently a $C_{2-7}$ linear alkyl group).

The following compounds may be mentioned as the compound (1). Among them, in view of a broad temperature range at which the composition shows a nematic liquid crystalline phase and a large dielectric anisotropy, preferred are the following compounds (1a-2), (1d-2), (1h-1), (1g-1), (1g-2), (1b-1), (1b-2), (1c-1), (1c-2), (1e-1), (1f-1), (1i-1) and (1j-1). Further, in view of a high nematic phase-isotropic phase transition temperature and a large refractive index anisotropy, preferred are the following compounds (1k-1), (1k-2), (1m-1) and (1m-2).

-continued

The following compounds (2a) to (2d) may, for example, be mentioned as the compound (2). Among them, preferred are the following compounds (2c) and (2d) in view of a high nematic phase-isotropic phase transition temperature and a large refractive index anisotropy.

The following compounds (3a) and (3b) are preferred as the compound (3). These compounds have low viscosity, whereby the viscosity of the liquid crystal composition can be reduced by using such a compound.

-continued

A preferred liquid crystal composition is one containing the compound (1) as an essential component and appropriately containing the compounds (2) and (3) in combination depending upon properties required for the liquid crystal optical modulation element. By use of the compound (2), the temperature range at which the liquid crystal composition shows liquid crystallinity can be broadened, and by use of the compound (3), the viscosity of the liquid crystal composition can be reduced. The liquid crystal composition is preferably, for example, a liquid crystal composition containing the following compounds (1a-2-1), (1g-1-1), (1d-2-1), (1d-2-2), (1d-2-3) and (3a-1).

The liquid crystal optical modulation element of the present invention is used mainly as mounted on an optical head device. Since the optical head device is used usually in an environment in the vicinity of room temperature and the temperature in the interior of the optical head device may increase to a level of 70° C., the liquid crystal composition is required to show nematic liquid crystallinity at least within a range of from 20 to 70° C. Further, in order that the liquid crystal optical modulation element stably operates, the crystalline phase-nematic phase transition point is preferably at most −20° C., and the nematic phase-isotropic phase transition point is preferably at least 90° C.

Liquid crystal compositions having a positive refractive index anisotropy value are exemplified above, but liquid crystal compositions having a negative refractive index anisotropy value may be used.

The liquid crystal composition in the present invention contains an antioxidant. The antioxidant in the present invention is not particularly limited so long as it is a compound effective for any one of (1) inhibition of the chain initiation, (2) inhibition of the chain growth and (3) decomposition of a peroxide in the radical reaction. Such an antioxidant is preferably a hindered amine compound or a hindered phenol compound. They may be used alone or a mixture of at least two types of each compound. Further, a hindered amine compound and a hindered phenol compound may be used in combination.

The hindered amine compound is preferably a compound having at least one group represented by the following formula (A), particularly preferably a 2,2,6,6-tetraalkylpiperidine derivative.

(A)

wherein each of $R^1$, $R^2$, $R^3$ and $R^4$ is an alkyl group or a phenyl group, and $R^5$ is a hydrogen atom, an alkyl group or an alkoxy group.

Each of $R^1$, $R^2$, $R^3$ and $R^4$ is preferably an alkyl group. The group may have either a linear structure or a branched structure and it preferably has a linear structure. Each of $R^1$ to $R^4$ is preferably an ethyl group or a methyl group, particularly preferably a methyl group. $R^1$, $R^2$, $R^3$ and $R^4$ may be the same groups or different groups, they are preferably the same groups, and particularly preferably all of $R^1$ to $R^4$ are methyl groups.

In a case where $R^5$ is an alkyl group, it is preferably a $C_{1-4}$ linear alkyl group, particularly preferably a methyl group. In a case where $R^5$ is an alkoxy group, such an alkoxy group may have any one of a linear structure, a branched structure and a structure partially having a ring, and it preferably has a linear structure. The number of carbon atoms constituting such an alkoxy group is from 1 to 18, preferably from 1 to 10. Such an alkoxy group may, for example, be a n-octyloxy group, a n-propyloxy group or a n-cyclohexyloxy group, preferably a n-octyloxy group. $R^5$ is preferably a hydrogen atom, a methyl group or a n-octyloxy group, particularly preferably a methyl group in view of a high stabilizing effect against a blue laser beam.

The group represented by the formula (A) is preferably the following group (A1), (A2) or (A3).

(A1)

(A2)

(A3)

The following compounds may, for example, be mentioned as the hindered amine compound in the present invention.

(A1-1)

(A2-1)

(A3-1)

The hindered phenol compound in the present invention is preferably a compound having a substituent at least one of the 2-position and the 6-position of the phenolic hydroxyl group. The substituent is preferably a methyl group or a t-butyl group. The hindered phenol compound may be any one of a monophenol, a bisphenol and a polyphenol and is suitably selected from compounds commercially available as a phenol type antioxidant.

The following compounds may, for example, be mentioned as the hindered phenol compound.

In the present invention, the antioxidant such as the hindered amine compound or the hindered phenol compound is used as added to the liquid crystal composition, and it may be added to the polyimide alignment film in addition to the liquid crystal composition without any problem. Further, each of the hindered amine compound and the hindered phenol compound may be used alone or a mixture of at least two types.

The amount of the hindered amine compound is preferably from 0.01 to 5 mass %, particularly preferably from 0.1 to 2 mass %, based on the liquid crystal composition, since the effect of preventing deterioration of properties of the optical modulation element tends to be small if the amount is small, and the temperature range at which the liquid crystal composition shows liquid crystallinity tends to be narrow if the amount is large.

The amount of the hindered phenol compound is preferably from 0.01 to 5 mass %, particularly preferably from 0.1 to 2 mass %, based on the liquid crystal composition, since the effect of preventing deterioration of properties of the optical modulation element tends to be small if the amount is small, and the temperature range at which the liquid crystal composition shows liquid crystallinity tends to be narrow if the amount is large.

Further, it is also possible to use the hindered amine compound and the hindered phenol compound in combination. In such a case, it is preferred to use the hindered phenol compound in an amount of at most the equivalent amount relative to the hindered amine compound, and the value of (the mass of the hindered phenol compound)/(the mass of the hindered phenol compound+the mass of the hindered amine compound) is preferably at most 0.5, particularly preferably from 0.01 and at most 0.3.

The antioxidant is not limited to the hindered amine compound or the hindered phenol compound and a sulfur type antioxidant or a phosphorus type antioxidant may be used.

Further, the liquid crystal composition in the present invention may contain another component such as an ultraviolet stabilizer or an ultraviolet absorber. For example, the liquid crystal optical modulation element of the present invention may be used as fixed to a module of e.g. an optical head device by means of an ultraviolet curable adhesive. In this case, the liquid crystal composition may contain an ultraviolet stabilizer to prevent deterioration of the performance of the liquid crystal optical modulation element by ultraviolet rays. The ultraviolet absorber is suitably selected from known ultraviolet stabilizers, and a benzotriazole compound, a benzophenone compound or a triazine compound may, for example, be used. Another component such as the ultraviolet stabilizer may be used within a range not to remarkably decrease the amount of the blue laser beam transmitted.

The liquid crystal optical modulation element of the present invention modulates a laser beam having a wavelength of at most 500 nm, preferably a laser beam having a wavelength of from 350 to 500 nm, particularly preferably a laser beam having a wavelength of from 380 to 450 nm. Specifically, there is a case where the polarization state or the wavefront state of the blue laser beam which entered the liquid crystal optical modulation element is modulated. Modulation of the polarization state may, for example, be a case where the entering linearly polarized light is modulated to an elliptically polarized light, a case where it is modulated to a circularly polarized light or a case where it is modulated to a linearly polarized light at right angles to the incident polarized light, and a liquid crystal optical modulation element having such a function can be utilized as a polarized light conversion element. The polarized light conversion element can be used as a light quantity control element as combined with a polarization beam splitter or a polarizing plate. Further, the liquid crystal optical modulation element to modulate the wavefront state can be utilized e.g. as an aberration correction element. Specifically, an aberration correction element to prevent reading error or an aberration correction element to suppress aberration simultaneously at all the wavelengths in the multi-wavelength compatible optical head device which compatibly employs at least two different wavelengths, may, for example, be mentioned.

The liquid crystal alignment direction in the liquid crystal optical modulation element of the present invention is preferably suitably selected depending upon the purpose of use. For example, in a case where the bonding angle of laminates is 0°, the liquid crystal is in a parallel alignment, and in a case where it is 180°, the liquid crystal is in an anti-parallel alignment, and a liquid crystal element in such an alignment state is used, for example, as an aberration correction element or a lens to adjust the optical axis. In a case where it is used as an aberration correction element, a phase change is required to be great, and a large refractive index anisotropy is required. The refractive index anisotropy at the time of driving can be increased by the alignment direction being the parallel alignment or the anti-parallel alignment.

Further, in a case where the bonding angle of laminates is not 0° nor 180°, the liquid crystal is in a twisted alignment, and a liquid crystal element in such an alignment state is used e.g. as a light quantity control element or a lens. A light quantity modulation element is required to change the polarization direction of the outgoing beam, and accordingly, a twisted alignment is preferred.

The driving system of the liquid crystal optical modulation element is not particularly limited, and the element may be a liquid crystal optical modulation element which operates in a transverse electric field such as IPS (in-plane switching) system.

The liquid crystal optical modulation element of the present invention is useful for e.g. an aberration correction element, a liquid crystal lens and a light quantity modulation element, and used mainly as mounted on an optical head device.

EXAMPLES

Now, the present invention will be described in further detail with reference to Examples. However, the present invention is by no means restricted to such specific Examples. Examples 1 to 3, 5, 6, 7 and 9 are Examples of the present invention, and Examples 4, 8 and 10 are Comparative Examples.

Application of a laser beam was carried out by using a Kr laser apparatus (manufactured by Coherent Inc., trade name: Innova: 300). The twist angle and the tilt angle of the liquid crystal element were measured by using a polarization measuring apparatus (manufactured by SHINTECH, Inc., trade name: OPTIPRO).

(1) Example for Preparation of Liquid Crystal Composition

The following compounds (1a-2-1), (1d-2-1), (1d-2-2), (1d-2-3), (1g-1-1) and (3a-1) were mixed in a ratio of 29.4/5.2/5.3/10.8/29.2/20.2 (mass ratio) to prepare a liquid crystal composition 1. The liquid crystal composition 1 showed a nematic phase at room temperature and underwent a phase transition from a nematic phase to an isotropic phase at 96.5° C. The degree of the refractive index anisotropy to a laser beam having a wavelength of 405 nm was 0.1 at room temperature.

(2) Test Example on Light Resistance of Liquid Crystal Composition 1

The liquid crystal composition 1 obtained in (1) was diluted with n-hexane to prepare a n-hexane solution 1 containing about 10 mass % of the liquid crystal composition 1, which was encapsulated in a quartz cell. The quartz cell had an optical path width of 4 mm and an optical path length of 10 mm, and the liquid height was adjusted to about 5 mm. Then, a Kr laser beam (central wavelength: 407 nm) was applied to the quartz cell to carry out an accelerated test on blue laser beam exposure. On that occasion, the output of the laser beam was adjusted to 120 mW and the beam diameter to about 3 mm, so that the laser beam could be uniformly applied to the n-hexane solution 1 in the quartz cell. Further, the application time was 300 hours.

After the laser beam application, the n-hexane solution 1 was recovered and analyzed by gas chromatography. The analysis results are shown in Table 1 together with the analysis results before the laser beam application. The numerical values in Table 1 are % by area of the compounds (1a-2-1), (1d-2-1), (1d-2-2), (1d-2-3), (1g-1-1) and (3a-1) calculated by excluding the peak of n-hexane. Since there was no change in % by area of each compound as between before and after the laser beam application and no new peak attributable to decomposed product or the like was observed, the liquid crystal composition 1 was confirmed to be a liquid crystal composition stable against a blue laser beam.

TABLE 1

| | Before application | After application |
|---|---|---|
| Compound 1a-2-1 | 28.85% | 28.83% |
| Compound 1d-2-1 | 5.20% | 5.24% |
| Compound 1d-2-2 | 5.28% | 5.27% |
| Compound 1d-2-3 | 10.70% | 10.61% |
| Compound 1g-1-1 | 30.39% | 30.26% |
| Compound 3a-1 | 19.59% | 19.78% |

(3) Preparation of Cell (3-1) Example (1) for Preparation of Cell

Two transparent glass substrates with a size of 100 mm×100 mm×0.53 mm in thickness were prepared. An ITO transparent electrically conductive film having a thickness of 15 nm was formed on each surface, followed by patterning by photolithography and wet etching to prepare transparent electrodes. Then, a polyamic acid solution (manufactured by Nissan Chemical Industries, Ltd., product number: SE510) was applied on each transparent electrode by spin coating, followed by baking to laminate a polyimide alignment film having a thickness of about 50 nm. The polyimide alignment films were subjected to rubbing treatment by means of rayon cloth to prepare a pair of laminates.

On a peripheral portion on the surface on which the polyimide alignment film was laminated of one of the laminates, an epoxy sealing agent (to the epoxy sealing agent, fiber spaces having a desired diameter and acrylic balls having electrically conductive coating applied thereto were added, and the cell gap can be adjusted by the diameter of the fiber spacers added) was printed by means of screen printing. Then, the other laminate was bonded so that the polyimide alignment films faced each other and that a predetermined bonding angle was kept, and the laminates were press-bonded under a pressure of $6 \times 10^4$ N/m$^2$ and cured by heating at 170° C. After the completion of the curing by heating, the laminates were cooled and cut into a size of 5 mm×5 mm to prepare a cell 1.

(3-2) Example (2) for Preparation of Cell

A cell 2 was prepared in the same manner as in (3-1), except that as the laminates, laminates obtained in such a manner were used that a transparent electrode was prepared on the surface of the glass substrate, and SiO$_2$ and ZrO$_2$ sol were applied to the surface of the transparent electrode by spin coating and baked to prepare an insulating film, and then a polyimide alignment film was formed on the surface of the insulating film.

(4) Example for Preparation and Evaluation of Liquid Crystal Element (4-1) Preparation of Liquid Crystal Composition Antioxidants were added in proportions as shown in Tables 2 to 4 to the liquid crystal composition 1 prepared in (1) to prepare liquid crystal compositions. Among the antioxidants, as a hindered amine compound, the following compounds (A2-3) (manufactured by ADEKA CORPORATION, product number: LA-62), (A1-1) and (A1-3) (manufactured by ADEKA CORPORATION, product number: LA-67) were used, and as a hindered phenol compound, the following compounds (B-1) (manufactured by ADEKA CORPORATION, product number: AO-60) and (B-2) (manufactured by Sumitomo Chemical Co., Ltd., product number: GA-80) were used.

The addition amounts in the following Tables were represented by mass % based on the entire liquid crystal composition 1, and in a case where a plurality of antioxidants were used, the addition amount is represented by each mass % based on the liquid crystal composition 1.

(4-2) Preparation of Liquid Crystal Element

The respective liquid crystal compositions obtained in (4-1) were injected into the cells obtained in (3) under reduced pressure, and the inlet was sealed by means of an ultraviolet curable adhesive to prepare liquid crystal elements. The cell used, the cell gap and the bonding angle are shown in Tables 2 to 4.

(4-3) Evaluation of Liquid Crystal Element

A Kr laser (central wavelength: 407 nm) was applied to the respective liquid crystal elements obtained in (4-2) under fabrication conditions shown in Tables 2 to 4 to carry out an accelerated test on blue laser beam exposure. The changes in the twist angle, the pretilt angle and the voltage-transmission curve between before and after the application are shown in Tables 2 to 4. In Example 3, the polarization direction of the laser beam entering the liquid crystal element 4 was adjusted to be substantially in parallel with the liquid crystal alignment direction, and in the other Example, the polarization direction of the laser beam entering the liquid crystal element was adjusted to be within the bonding angle.

TABLE 2

|  |  | Ex. 1 | Ex. 2 | Ex. 3 | Ex. 4 |
|---|---|---|---|---|---|
| Hindered amine | Compd. (A2-3) | 0.6 | — | — | — |
|  | Compd. (A1-1) | — | 0.3 | — | — |
|  | Compd. (A1-3) | — | — | 0.6 | — |
| Hindered phenol | Compd. (B-1) | — | — | — | — |
|  | Compd. (B-2) | — | — | — | — |
|  | Cell | Cell 1 | Cell 1 | Cell 1 | Cell 1 |
|  | Cell gap (μm) | 3.2 | 3.2 | 4.3 | 3.2 |
|  | Bonding angle (°) | About 45 | About 45 | 180 | About 45 |
|  | Test temp. (° C.) | Room temperature | Room temperature | Room temperature | Room temperature |

TABLE 2-continued

|  |  | Ex. 1 | Ex. 2 | Ex. 3 | Ex. 4 |
|---|---|---|---|---|---|
| Application intensity (mW) | | 80 | 80 | 80 | 80 |
| Application time (h) | | 300 | 300 | 300 | 300 |
| Twist angle (°) | Before test | 45.7 | 45.7 | 180 | 45.7 |
| | After test | 45.8 | 45.9 | 180 | 50.8 |
| Pretilt angle (°) | Before test | 2.3 | 2.3 | 2.2 | 2.3 |
| | After test | 2.3 | 2.4 | 2.3 | 5.8 |
| Voltage-transmission curve | | No change | No change | No change | Remarkable change |

TABLE 3

|  |  | Ex. 5 |  | Ex. 6 |  |
|---|---|---|---|---|---|
| Hindered amine | Compd. (A2-3) | 1.7 | | 2.0 | |
| | Compd. (A1-1) | — | | — | |
| | Compd. (A1-3) | — | | — | |
| Hindered phenol | Compd. (B-1) | 0.3 | | — | |
| | Compd. (B-2) | — | | — | |
| Cell | | Cell 2 | | Cell 2 | |
| Cell gap (μm) | | 3.5 | | 3.5 | |
| Bonding angle | | About 50 | | About 50 | |
| Test temp. (° C.) | | 60 | | 60 | |
| Application intensity (mW) | | 160 | | 160 | |
| Application time (h) | | 600 | 680 | 600 | 680 |
| Twist angle (°) | Before test | 51.5 | | 51.5 | |
| | After test | 51.5 | 51.5 | 51.5 | Measurement impossible |
| Pretilt angle (°) | Before test | 3.5 | | 3.5 | |
| | After test | 3.5 | 3.5 | 3.5 | Measurement impossible |
| Voltage-transmission curve | | No change | No change | No change | — |

TABLE 4

|  |  | Ex. 7 | Ex. 8 | Ex. 9 | Ex. 10 |
|---|---|---|---|---|---|
| Hindered amine | Compd. (A2-3) | 1.7 | — | — | — |
| | Compd. (A1-1) | — | — | — | — |
| | Compd. (A1-3) | — | — | — | — |
| Hindered phenol | Compd. (B-1) | — | — | — | — |
| | Compd. (B-2) | 0.3 | — | 0.3 | — |
| Cell | | Cell 2 | Cell 2 | Cell 2 | Cell 2 |
| Cell gap (μm) | | 3.5 | 3.5 | 3.5 | 3.5 |
| Bonding angle | | 50 | 50 | 50 | 50 |
| Test temp. (° C.) | | 60 | 60 | 60 | 60 |
| Application intensity (mW) | | 100 | 100 | 100 | 100 |
| Application time (h) | | 380 | 380 | 400 | 400 |
| Twist angle (°) | Before test | 50.9 | 50.9 | 51.0 | 51.0 |
| | After test | 50.9 | Measurement impossible | 51.0 | Measurement impossible |
| Pretilt angle (°) | Before test | 2.5 | 2.5 | 2.6 | 2.6 |
| | After test | 2.5 | Measurement impossible | 2.6 | Measurement impossible |
| Voltage-transmission curve | | No change | No change | No change | — |

INDUSTRIAL APPLICABILITY

With the liquid crystal optical modulation element of the present invention, the change of the liquid crystal alignment state caused by the application of a blue laser beam can be suppressed. Thus, it is useful as an optical modulation element to modulate a blue laser beam, capable of preventing deterioration of optical modulation properties.

The entire disclosure of Japanese Patent Application No. 2004-191257 filed on Jun. 29, 2004 including specification, claims, drawings and summary is incorporated herein by reference in its entirety.

What is claimed is:

1. A liquid crystal optical modulation element operable to modulate a laser beam having a wavelength of at most 500 nm, which comprises:

a layer comprising a liquid crystal composition sandwiched between a pair of transparent substrates facing each other, wherein each transparent substrate has an electrode and an alignment film comprising a polyimide on the surface thereof which faces the other transparent substrate, the alignment film and the liquid crystal composition are in contact with each other, and the liquid crystal composition comprises at least one antioxidant comprising at least one hindered amine and at least one hindered phenol, the value of (the mass of the hindered phenol)/(the mass of the hindered phenol+the mass of the hindered amine) is at most 0.5.

2. A liquid crystal optical modulation element operable to modulate a laser beam having a wavelength of at most 500 nm, which comprises:

a layer comprising a liquid crystal composition sandwiched between a pair of transparent substrates facing each other, wherein each transparent substrate has an electrode and an alignment film comprising a polyimide on the surface thereof which faces the other transparent substrate, the alignment film and the liquid crystal composition are in contact with each other, and the liquid crystal composition comprises at least one antioxidant comprising at least one hindered amine and at least one hindered phenol, the value of (the mass of the hindered phenol)/(the mass of the hindered phenol+the mass of the hindered amine) is from 0.01 and at most 0.3.

3. A liquid crystal optical modulation element operable to modulate a laser beam having a wavelength of at most 500 nm, which comprises:

a layer comprising a liquid crystal composition comprising at least one compound selected from the group consisting of:

(1)

(2) and (3)

wherein j, k, p, q: each independently 0 or 1;

$R^{11}, R^{21}, R^{22}, R^{31}$: each independently a $C_{2-7}$ linear alkyl group, a $C_{2-7}$ linear alkoxy group, a $C_{2-7}$ linear alkenyl group or a $C_{2-7}$ linear alkenyloxy group;

$R^{12}$: a fluorine atom, a trifluoromethyl group, a trifluoromethoxy group or a difluoromethoxy group;

$R^{32}$: a $C_{2-7}$ linear alkyl group or a $C_{2-7}$ linear alkoxy group;

$X^{11}, X^{12}, X^{13}, X^{21}, X^{22}, X^{23}$ and $X^{31}$: each independently a single bond, $-(CH_2)_2-$, $-(CH_2)_4-$, $-CH_2O-$, $-OCH_2-$, $-(CF_2)_2-$, $-CF_2O-$ or $-OCF_2-$;

$A^{11}, A^{21}, A^{22}, A^{31}$: each independently a trans-1,4-cyclohexylene group or a decahydronaphthalene-2,6-diyl group;

$B^{11}, B^{12}, B^{21}, B^{22}$: each independently a trans-1,4-cyclohexylene group, a decahydronaphthalene-2,6-diyl group, a 1,4-phenylene group or a 1,2,3,4-tetrahydronaphthalene-2,6-diyl group; and

$C^{11}, C^{31}$: a 1,4-phenylene group or a 1,2,3,4-tetrahydronaphthalene-2,6-diyl group, said layer sandwiched between a pair of transparent substrates facing each other, and wherein each transparent substrate has an electrode and an alignment film comprising a polyimide on the surface thereof which faces the other transparent substrate, the alignment film and the liquid crystal composition are in contact with each other, and the liquid crystal composition comprises at least one antioxidant.

4. The element according to claim 3, wherein (1) is at least one member selected from the group consisting of:

(1a-1)

(1a-2)

(1a-3)

(1b-1)

(1b-2)

(1c-1)

(1c-2)

(1d-1)

(1d-2)

(1d-3)

wherein $R^A$ is a $C_{2-7}$ linear alkyl group.

5. The element according to claim 3, wherein (2) is at least one selected from the group consisting of:

(2d)

wherein $R^A$ and $R^B$ are each independently a $C_{2-7}$ linear alkyl group.

6. The element according to claim 3, wherein (3) is at least one selected from the group consisting of:

(3a)

(3b)

wherein $R^A$ and $R^B$ are each independently a $C_{2-7}$ linear alkyl group.

7. The element according to claim 3, wherein said liquid crystal composition comprises:

(3a-1)

(1a-2-1)

(1g-1-1)

(1d-2-1)

(1d-2-2)

(1d-2-3)

8. A liquid crystal optical modulation element operable to modulate a laser beam having a wavelength of at most 500 nm, which comprises:

a layer comprising a liquid crystal composition sandwiched between a pair of transparent substrates facing each other, wherein each transparent substrate has an electrode and an alignment film comprising a polyimide on the surface thereof which faces the other transparent substrate, the alignment film and the liquid crystal composition are in contact with each other, and the liquid crystal composition comprises at least one antioxidant comprising at least one hindered amine selected from the group consisting of:

(A1-1)

(A2-1)

(A3-1)

(A1-2)

-continued wherein $R^6=$ $R^7=$

9. A liquid crystal optical modulation element operable to modulate a laser beam having a wavelength of at most 500 nm, which comprises:

a layer comprising a liquid crystal composition sandwiched between a pair of transparent substrates facing each other, wherein each transparent substrate has an electrode and an alignment film comprising a polyimide on the surface thereof which faces the other transparent substrate, the alignment film and the liquid crystal composition are in contact with each other, and the liquid crystal composition comprises at least one antioxidant comprising at least one hindered phenol selected from the group consisting of:

* * * * *